US012667829B2

(12) United States Patent
Wei et al.

(10) Patent No.: US 12,667,829 B2
(45) Date of Patent: Jun. 30, 2026

(54) ULTRA-LOW ZEOLITE CONTENT FCC CATALYST IN-SITU CRYSTALLIZATION

(71) Applicant: BASF CORPORATION, Florham Park, NJ (US)

(72) Inventors: Junmei Wei, Iselin, NJ (US); Nicholas Robert Favate, Iselin, NJ (US); Samantha L. Rice, Iselin, NJ (US); Lucas Dorazio, Iselin, NJ (US)

(73) Assignee: BASF CORPORATION, Florham Park, NJ (US)

( * ) Notice: Subject to any disclaimer, the term of this patent is extended or adjusted under 35 U.S.C. 154(b) by 511 days.

(21) Appl. No.: 17/921,668

(22) PCT Filed: Apr. 29, 2021

(86) PCT No.: PCT/US2021/029844
§ 371 (c)(1),
(2) Date: Oct. 27, 2022

(87) PCT Pub. No.: WO2021/222536
PCT Pub. Date: Nov. 4, 2021

(65) Prior Publication Data
US 2023/0166244 A1 Jun. 1, 2023

Related U.S. Application Data

(60) Provisional application No. 63/017,432, filed on Apr. 29, 2020.

(51) Int. Cl.
| | |
|---|---|
| *B01J 29/08* | (2006.01) |
| *B01J 21/04* | (2006.01) |
| *B01J 35/08* | (2006.01) |
| *B01J 35/10* | (2006.01) |
| *B01J 35/40* | (2024.01) |
| *B01J 35/45* | (2024.01) |
| *B01J 35/51* | (2024.01) |
| *B01J 35/61* | (2024.01) |
| *B01J 35/70* | (2024.01) |
| *B01J 35/77* | (2024.01) |
| *B01J 37/02* | (2006.01) |
| *B01J 37/04* | (2006.01) |
| *B01J 37/08* | (2006.01) |

(52) U.S. Cl.
CPC ............. *B01J 29/084* (2013.01); *B01J 21/04* (2013.01); *B01J 35/40* (2024.01); *B01J 35/45* (2024.01); *B01J 35/51* (2024.01); *B01J 35/61* (2024.01); *B01J 35/70* (2024.01); *B01J 35/77* (2024.01); *B01J 37/0215* (2013.01); *B01J 37/04* (2013.01); *B01J 37/08* (2013.01); *B01J 2229/42* (2013.01); *B01J 2229/64* (2013.01); *B01J 2235/15* (2024.01)

(58) Field of Classification Search
CPC . B01J 29/084; B01J 35/51; B01J 35/61; B01J 21/04; B01J 37/0215; B01J 37/04; B01J 37/08
See application file for complete search history.

(56) References Cited

U.S. PATENT DOCUMENTS

| | | | | |
|---|---|---|---|---|
| 3,506,594 A | | 4/1970 | Walter, Jr. et al. | |
| 3,647,718 A | | 3/1972 | Waler, Jr. et al. | |
| 4,493,902 A | * | 1/1985 | Brown .................. | C10G 11/05 502/68 |
| 4,631,262 A | | 12/1986 | Altomare | |

FOREIGN PATENT DOCUMENTS

WO WO-2018201046 A1 * 11/2018

OTHER PUBLICATIONS

International Search Report for PCT/US2021/029844 mailed Aug. 12, 2021, 3 pages.
"An Innovative New Technology Platform for FCC Distillate Maximization" BASF, Jan. 1, 2015, 12 pages.

\* cited by examiner

*Primary Examiner* — Yong L Chu
(74) *Attorney, Agent, or Firm* — Peter Dimauro

(57) ABSTRACT

The present technology provides a method of making a fluid catalytic cracking (FCC) catalyst, the method includes: in situ crystallizing Y-zeolite on a precursor microsphere to provide the FCC catalyst, wherein the in situ crystallizing includes: mixing the precursor microspheres with sodium silicate, a zeolite initiator (seeding zeolite crystals), and water to form an alkaline slurry; and heating the alkaline slurry to a temperature of about 38° C. (100° F.) to about 93° C. (200° F.) to obtain a zeolitic microsphere material; and wherein the FCC catalyst has a zeolite content of less than or equal to about 30 weight percent (wt. %). The unit cell size of the zeolite Y is 24.60 to 24.70 angstrom.

18 Claims, 3 Drawing Sheets

ULTRA-LOW ZEOLITE CONTENT FCC CATALYST IN-SITU CRYSTALLIZATION

The present application is a national stage entry under 35 U.S.C. § 371 of International Application No. PCT/US2021/029844, filed on Apr. 29, 2021, which claims priority to U.S. Provisional Patent Application No. 63/017,432, filed on Apr. 29, 2020, the entire contents of which are incorporated herein by reference in their entirety.

TECHNICAL FIELD

The present technology relates to a preparation of a fluid catalytic cracking (FCC) catalyst. More particularly, the present technology relates to methods for the in-situ preparation of a low zeolite content FCC catalyst.

BACKGROUND

Catalytic cracking is a petroleum refining process that is applied commercially on a very large scale. Catalytic cracking, and particularly fluid catalytic cracking (FCC), is routinely used to convert heavy hydrocarbon feedstocks to lighter products, such as gasoline and distillate range fractions. In FCC processes, a hydrocarbon feedstock is injected into the riser section of a FCC unit, where the feedstock is cracked into lighter, more valuable products upon contacting hot catalyst circulated to the riser-reactor from a catalyst regenerator.

SUMMARY

In one aspect, the present technology provides a method of making a fluid catalytic cracking (FCC) catalyst that includes in situ crystallizing Y-zeolite on a precursor microsphere to provide the FCC catalyst, wherein the in situ crystallizing includes mixing the precursor microspheres with sodium silicate, a zeolite initiator, and water to form an alkaline slurry; and heating the alkaline slurry to a temperature of less than or equal to about 200° F. to obtain a zeolitic microsphere material; and wherein the FCC catalyst has a zeolite content of less than or equal to about 30 weight percent (wt. %). For example, in any embodiment disclosed herein, the heating may occur at a temperature of about 100° F. to about 200° F.

In a related aspect, the present technology includes a FCC catalyst prepared according to the method of making described herein in any embodiment.

In another aspect, the present technology provides a method of cracking a hydrocarbon feed that includes contacting said feed with a FCC catalyst prepared according to the methods described herein in any embodiment.

In another aspect, the present technology provides a method of improving bottoms-coke selectivity in an FCC system, wherein the method includes using an FCC catalyst prepared according to the methods described herein in any embodiment.

In an aspect, the preset technology provides a zeolitic microspherical material that includes less than or equal to about 30 wt. % of Y-zeolite and a non-zeolitic matrix material; where the zeolitic microspherical material is free, or substantially free, of zeolite P; the zeolitic microspherical material has a zeolite to matrix ratio of about 0.3 to about 3; and the Y-zeolite is an in situ crystallized Y-zeolite having a unit cell size of about 24.60 Å to about 24.70 Å.

In a related aspect, the preset technology provides a method of making a FCC catalyst that includes calcining a zeolitic microspherical material; wherein the zeolitic microspherical material includes less than or equal to about 30 wt. % of Y zeolite and a non-zeolitic matrix material, the material is free, or substantially free, of zeolite P, the material has a zeolite to matrix ratio of about 0.3 to about 3; and the Y zeolite is an in situ crystallized Y zeolite having a unit cell size of about 24.60 Å to about 24.70 Å. For example, in any embodiment disclosed herein, the calcining may occur at a temperature of about 400° F. to about 1600° F.

In yet another related aspect, the present technology provides a FCC catalyst that includes a calcined zeolitic microspherical material that includes less than or equal to about 30 wt. % of Y zeolite and a non-zeolitic matrix material; wherein the catalyst is free, or substantially free, of zeolite P, the catalyst has a zeolite to matrix ratio of about 0.3 to about 3, and the Y zeolite is an in situ crystallized Y zeolite having a unit cell size of about 24.60 Å to about 24.70 Å.

DETAILED DESCRIPTION

Figure 1:
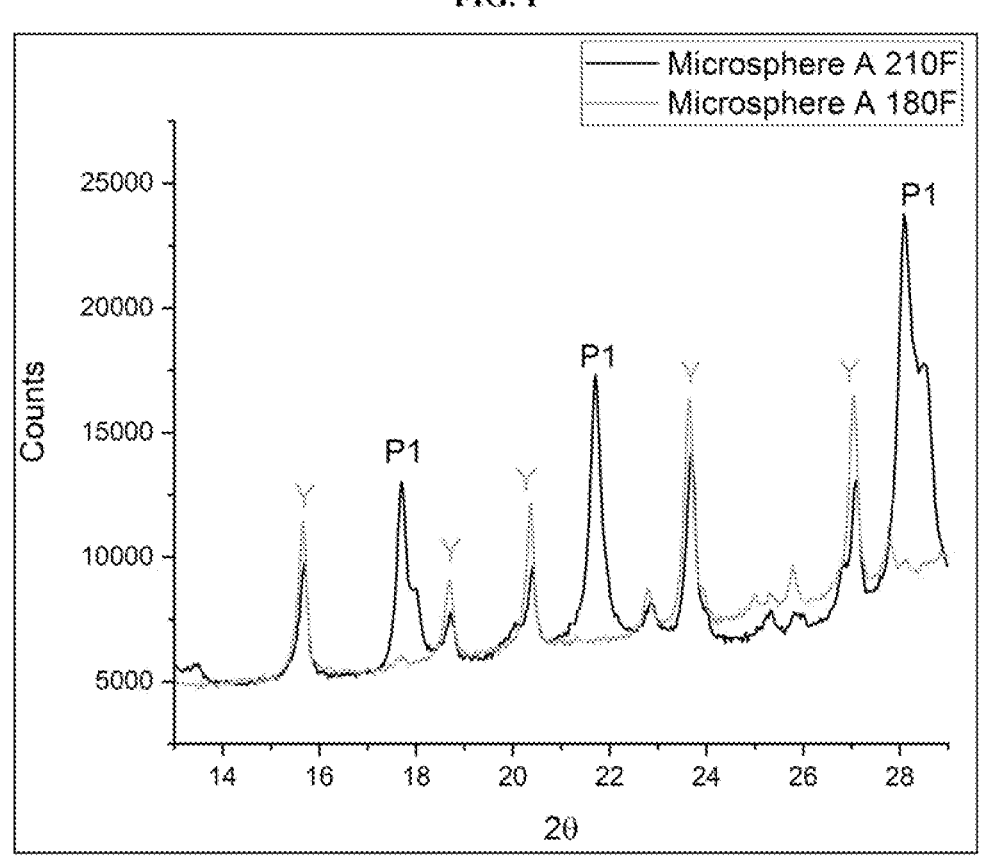
FIG. 1 is a graphical illustration of an X-Ray Diffraction (XRD) scan of catalyst crystallized at both 210° F. and 180° F.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

It has been found that improving bottoms upgrading requires high matrix activity. Traditional in-situ crystallization with zeolite-Y yields of above 35 wt. % occurs at 210°

F. (~98° C.) in the presence of zeolite-Y seeds—as disclosed in U.S. Pat. Nos. 4,493,902, and 5,395,809—or 180° F. (~82° C.) without zeolite-Y seeds—as disclosed in U.S. Pat. No. 3,647,718. However, it is challenging to perform in-situ crystallization at 210° F. in the presence of zeolite-Y seeds in order to obtain a zeolite yield lower than 30 wt. %. This is primarily due to the formation of zeolite P1, which grows simultaneously with zeolite-Y if theoretical zeolite-Y yield is below 30 wt. %. Zeolite P1 is undesirable as it is not active for FCC, leads to the fracture of the microsphere, and fine generation. High zeolite content may also lead to total macropore loss for some FCC catalysts.

The present technology provides a novel in-situ crystallization method to crystalize FCC catalyst having a zeolite content lower than 30 wt. % and without zeolite P1 formation. Surprisingly, the inventors discovered that during crystallization, no detectable amounts of zeolite P1 were observed if the crystallization temperature is from about 150° F. (~65° C.) to about 200° F. (~93° C.). Without being bound by theory, it is believed that lowering zeolite content in the FCC catalyst lowers the ratio of zeolite surface area to matrix surface area (Z/M or "zeolite to matrix ratio"), and therefore, varying the relative amount of zeolite and matrix may shift the bottoms-coke selectivity. Thus, lowering the ratio of the zeolite surface area to matrix surface area (Z/M) is believed to increase bottoms cracking on matrix and ultimately improve bottoms-coke selectivity. The method of the present technology may be used to prepare FCC catalysts with very low zeolite content using a variety of matrix materials, e.g., pure clay, pure alumina, or mixtures thereof.

Method of Making

In one aspect, the present technology provides a method of making a fluid catalytic cracking (FCC) catalyst that includes in situ crystallizing Y-zeolite on a precursor microsphere to provide the FCC catalyst, wherein the in situ crystallizing includes mixing the precursor microspheres with sodium silicate, a zeolite initiator, and water to form an alkaline slurry; and heating the alkaline slurry to a temperature of less than or equal to about 200° F. to obtain a zeolitic microspherical material; and wherein the FCC catalyst has a zeolite content of less than or equal to about 30 weight percent (wt. %).

In any embodiment disclosed herein, the heating may occur at a temperature of less than or equal to about 200° F. In any embodiment disclosed herein, the heating may occur at a temperature of about 100° F. to about 200° F. For example, in any embodiment disclosed herein, the temperature may be about 100° F. (38° C.) to about 200° F. (~94° C.), 150° F. (~65° C.) to about 200° F. (~94° C.), about 175° F. (~79° C.) to about 185° F. (85° C.), about 180° F. (~82° C.) to about 190° F. (~88° C.), or any range including and/or in between any two of the preceding values. Suitable temperatures may include, but are not limited to, about 100° F., about 105° F., about 110 GF, about 115° F., about 120° F., about 125° F., about 130° F., about 135° F., about 140° F., about 145° F., about 150° F., about 155° F., about 160° F., about 165° F., about 170° F., about 175° F., about 180° F., about 185° F., about 190° F., about 195° F., about 200° F., or any range including and/or in between any two of the preceding values.

In any embodiment disclosed herein, the beating may occur at a temperature of less than or equal to about 94° C. In any embodiment disclosed herein, the heating may occur at a temperature of about 38° C. to about 94° C. For example, in any embodiment disclosed herein, the temperature may be from about 38° C. to about 94° C., about 65° C. to about 94° C., about 79° C. to about 85° C. about 82° C.

to about 88° C., or any range including and/or in between any two of the preceding values. Suitable temperature may include, but are not limited to, about 38, about 41° C., about 43° C., about 46° C., about 49° C., about $1° C., about 54° C., about 57° C., about 60° C., about 63° C., about 65° C., about 68° C., about 71° C., about 74° C., about 77° C., about 79° C., about 82° C., about 85° C., about 88° C., about 90° C., about 94° C., or any range including and/or in between any two of the preceding values.

In any embodiment disclosed herein, the alkaline slurry may be heated for a time sufficient to crystallize from at least about 5 wt. % to less than about 30 wt. % of Y-zeolite in the zeolitic microspherical material, based on total weight of the zeolitic microspherical material. For example, in any embodiment disclosed herein, the alkaline slurry may be heated for a time sufficient to crystallize about 5 wt. %, about 6 wt. %, about 7 wt. %, about 8 wt. %, about 9 wt. %, about 10 wt. %, about 11 wt. %, about 12 wt. %, about 13 wt. %, about 14 wt. %, about 15 wt. %, about 16 wt. %, about 17 wt. %, about 18 wt. %, about 19 wt. %, about 20 wt. %, about 21 wt. %, about 22 wt. %, about 23 wt. %, about 24 wt. %, about 25 wt. %, about 26 wt. %, about 27 wt. %, about 28 wt. %, about 29 wt. %, less than about 30 wt. %, or any range including and/or in between any two of the preceding values.

In any embodiment disclosed herein, the method may include crystallizing at least about 5 wt. % to about 30 wt. % of Y-zeolite in or on the precursor microspheres. For example, in any embodiment disclosed herein, the method may include crystallizing Y-zeolite in or on the precursor microspheres in an amount of about 5 wt. %, about 6 wt. %, about 7 wt. %, about 8 wt. %, about 9 wt. %, about 10 wt. %, about 11 wt. %, about 12 wt. %, about 13 wt. %, about 14 wt. %, about 15 wt. %, about 16 wt. %, about 17 wt. %, about 18 wt. %, about 19 wt. %, about 20 wt. %, about 21 wt. %, about 22 wt. %, about 23 wt. %, about 24 wt. %, about 25 wt. %, about 26 wt. %, about 27 wt. %, about 28 wi. %, about 29 wt. %, less than about 30 wt. %, or any range including and/or in between any two of the preceding values.

In any embodiment disclosed herein, the precursor microspheres may include a non-zeolitic material. Suitable non-zeolitic materials may include, but are not limited to, clay, alumina, or a mixture thereof. In any embodiment disclosed herein, the non-zeolitic material may include calcined halloysite, montmorillonite, bentonite, attapulgite, kaolin, sepiolite, gibbsite, boehmite, aluminosilicate, and silica-alumina. In any embodiment disclosed herein, the non-zeolitic material may be alumina. For example, in any embodiment disclosed herein, the alumina may be formed from crystalline boehmite, bayerite, gamma alumina, transitional alumina, or a mixture thereof.

In any embodiment disclosed herein, the alumina may further include a rare earth element. For example, in any embodiment disclosed herein, the rare earth element may be ytterbium, gadolinium, cerium, lanthanum, yttrium, or a mixture of any two or more thereof. In any embodiment herein, the rare earth element may be lanthanum. In any embodiment disclosed herein, the alumina may include the rare earth element in an amount of about 0.1 wt. % to about 6 wt. %, based on total weight of the zeolitic microspherical material. Suitable amounts of the rare earth element may include, but are not limited to, about 0.1 wt. %, about 0.2 wt. %, about 0.3 wt. %, about 0.4 wt. %, about 0.5 wt. %, about 0.6 wt. %, about 0.7 wt. %, about 0.8 wt. %, about 0.9 wt. %, about 1.0 wt. %, about 1.5 wt. %, about 2.0 wt. %, about 2.5 wt. %, about 3.0 wt. %, about 3.5 wt. %, about 4.0 wt. %, about 4.5 wt. %, about 5.0 wt. %, about 5.5 wt. %, about 6.0 wt. %, based on total weight of the zeolitic microspherical material, or any range including and/or in between any two of the preceding values. In any embodiment disclosed herein, the alumina may include no rare earth element.

In any embodiment disclosed herein, the non-zeolitic material may include calcined halloysite, montmorillonite, bentonite, attapulgite, kaolin, sepiolite, gibbsite, boehmite, aluminosilicate, and silica-alumina.

In any embodiment disclosed herein, the method may further include pre-forming the precursor microspheres, that include: spray drying a solid slurry that includes the non-zeolitic material, sodium silicate, or a mixture thereof to obtain the precursor microspheres; and calcining the precursor microspheres at a temperature from about 1500° F. to about 1800° F.

In any embodiment disclosed herein, the precursor microspheres may be calcined at a temperature from about 1500° F. (~816° C.) to about 1800° F. (~982° C.). Suitable calcination temperatures may include, but are not limited to, about 1500° F. (~816° C.), about 1550° F. (~843° C.), about 1600° F. (~871° C.), about 1650° F. (~899° C.), about 1700° F. (~927° C.), about 1750° F. (~954° C.), about 1800° F. (~982° C.), or any range including and/or in between any two of the preceding values.

In any embodiment disclosed herein, the alkaline slurry may further include an alkali metal hydroxide. For example, in any embodiment herein, the alkali metal hydroxide may be sodium hydroxide.

In any embodiment disclosed herein, the alkaline slurry may have a weight ratio of zeolite initiator to precursor microspheres from about 0.0002 to about 0.01. Suitable weight ratios of zeolite initiator to precursor microspheres may include, but are not limited to, about 0.0002, about 0.0003, about 0.0004, about 0.0005, about 0.0006, about 0.0007, about 0.0008, about 0.0009, about 0.001, about 0.002, about 0.003, about 0.004, about 0.005, about 0.006, about 0.007, about 0.008, about 0.009, about 0.01, or any range including and/or in between any two of the preceding values.

In any embodiment disclosed herein, the alkaline slurry may have a weight ratio of reactive $SiO_2$ to $Al_2O_3$ of about 5 to about 80. Suitable weight ratios of the reactive $SiO_2$ to $Al_2O_3$ may include, but are not limited to, about 5, about 6, about 7, about 8, about 9, about 10, about 12, about 14, about 16, about 18, about 20, about 22, about 24, about 26, about 28, about 30, about 32, about 34, about 36, about 38, about 40, about 42, about 44, about 46, about 48, about 50, about 52, about 54, about 56, about 58, about 60, about 62, about 64, about 66, about 68, about 70, about 72, about 74, about 76, about 78, about 80, or any range including and/or in between any two of the preceding values.

In any embodiment disclosed herein, the alkaline slurry may have a weight ratio of reactive $SiO_2$ to $Na_2O$ of about 1 to about 5. Suitable weight ratios of reactive $SiO_2$ to $Na_2O$ may include, but are not limited to, about 1.0, about 1.1, about 1.2, about 1.3, about 1.4, about 1.5, about 1.6, about 1.7, about 1.8, about 1.9, about 2.0, about 2.1, about 2.2, about 2.3, about 2.4, about 2.5, about 2.6, about 2.7, about 2.8, about 2.9, about 3.0, about 3.1, about 3.2, about 3.3, about 3.4, about 3.5, about 3.6, about 3.7, about 3.8, about 3.9, about 4.0, about 4.1, about 4.2, about 4.3, about 4.4, about 4.5, about 4.6, about 4.7, about 4.8, about 4.9, about 5.0, or any range including and/or in between any two of the preceding values.

In any embodiment disclosed herein, the alkaline slurry may have a weight ratio of water to $Na_2O$ of about 3 to about 12. Suitable weight ratios of water to $Na_2O$ may include, but are not limited to, about 3.0, about 3.5, about 4.0, about 4.5, about 5.0, about 5.5, about 6.0, about 6.5, about 7.0, about 7.5, about 8.0, about 8.5, about 9.0, about 9.5, about 10.0, about 10.5, about 11.0, about 11.5, about 12.0, or any range including and/or in between any two of the preceding values.

In any embodiment disclosed herein, the zeolitic microspherical material may be free, or substantially free, of zeolite P. As used herein, "substantially free of zeolite P" refers to amounts of detectable zeolite P that may be less than or equal to about 2 wt. %, based on total weight of the zeolitic microspherical material. For example, in any embodiment disclosed herein, the zeolitic microspherical material may include detectable zeolite P in amounts less than or equal to about 2 wt. % to about 0.01 wt. %, based on total weight of the zeolitic microspherical material. For example, in any embodiment disclosed herein, the zeolitic microspherical material may include detectable zeolite P in amounts of less than or equal to about 2 wt. %, about 1.5 wt. %, about 1.0 wt. %, about 0.5 wt. %, about 0.01 wt. %, based on total weight of the zeolitic microspherical material, or any range including and/or in between any two of the preceding values. In any embodiment disclosed herein, the method as described herein may not form zeolite P. In any embodiment disclosed herein, the zeolitic microspherical material may be free of zeolite P; for example, as disclosed herein in any embodiment, the zeolitic microspherical material may include no detectable amounts of zeolite P. In any embodiment disclosed herein, the zeolite P may include zeolite P1.

In any embodiment disclosed herein, the method may further include separating the zeolitic microspherical material from the alkaline slurry. For example, in any embodiment disclosed herein, the method may include separating the zeolitic microspherical material from a major portion of the alkaline slurry. As used herein, "a major portion of the alkaline slurry" refers to an amount that is greater than or equal to about 60 wt. %, about 65 wt. %, about 70 wt. %, about 75 wt. %, about 80 wt. %, about 85 wt. %, about 90 wt. %, about 95 wt. %, about 99 wt. %, based on total weight of the alkaline slurry, or any range including and/or in between any two of the preceding values.

In any embodiment disclosed herein, the Y-zeolite may have a unit cell size of about 24.60 Å to about 24.70 Å. Suitable Y-zeolite unit cell sizes may include, but are not limited to, about 24.60 Å, about 24.61 Å, about 24.62 Å, about 24.63 Å, about 24.64 Å, about 24.65 Å, about 24.66 Å, about 24.67 Å, about 24.68 Å, about 24.69 Å, about 24.70 Å, or any range including and/or in between any two of the preceding values.

In any embodiment disclosed herein, the FCC catalyst may have a zeolite surface area of about 30 $m^2$/g to about 200 $m^2$/g. Suitable zeolite surface area amounts may include, but are not limited to, about 30 $m^2$/g, about 35 $m^2$/g, about 40 $m^2$/g, about 45 $m^2$/g, about 50 $m^2$/g, about 55 $m^2$/g, about 60 $m^2$/g, about 65 $m^2$/g, about 70 $m^2$/g, about 75 $m^2$/g, about 80 $m^2$/g, about 85 $m^2$/g, about 90 $m^2$/g, about 95 $m^2$/g, about 100 $m^2$/g, about 105 $m^2$/g, about 110 $m^2$/g, about 115 $m^2$/g, about 120 $m^2$/g, about 125 $m^2$/g, about 130 $m^2$/g, about 135 $m^2$/g, about 140 $m^2$/g, about 145 $m^2$/g, about 150 $m^2$/g, about 155 $m^2$/g, about 160 $m^2$/g, about 165 $m^2$/g, about 170 $m^2$/g, about 175 $m^2$/g, about 180 $m^2$/g, about 185 $m^2$/g, about 190 $m^2$/g, about 195 $m^2$/g, about 200 $m^2$/g, or any range including and/or in between any two of the preceding values.

In any embodiment disclosed herein, the FCC catalyst may have a matrix surface area of about 70 $m^2$/g to about 175 $m^2$/g. Suitable matrix surface area amounts may include, but are not limited to, about 70 m$^2$/g, about 75 m$^2$/g, about 80 m$^2$/g, about 85 m$^2$/g, about 90 m$^2$/g, about 95 m$^2$/g, about 100 m$^2$/g, about 105 m$^2$/g, about 110 m$^2$/g, about 115 m$^2$/g, about 120 m$^2$/g, about 125 m$^2$/g, about 130 m$^2$/g, about 135 m$^2$/g, about 140 m$^2$/g, about 145 m$^2$/g, about 150 m$^2$/g, about 155 m$^2$/g, about 160 m$^2$/g, about 165 m$^2$/g, about 170 m$^2$/g, about 175 m$^2$/g, or any range including and/or in between any two of the preceding values.

In any embodiment disclosed herein, the FCC catalyst may have a zeolite to matrix (Z/M) ratio of about 0.3 to about 3. Suitable zeolite to matrix ratios may include, but are not limited to, about 0.3, about 0.4, about 0.5, about 0.6, about 0.7, about 0.8, about 0.9, about 1.0, about 1.1, about 1.2, about 1.3, about 1.4, about 1.5, about 1.6, about 1.7, about 1.8, about 1.9, about 2.0, about 2.1, about 2.2, about 2.3, about 2.4, about 2.5, about 2.6, about 2.7, about 2.8, about 2.9, about 3.0, or any range including and/or in between any two of the preceding values.

In a related aspect, the present technology includes a FCC catalyst prepared according to the method of making described herein in any embodiment.

Method of Use

In another aspect, the present technology provides a method of cracking a hydrocarbon feed that includes contacting said feed with a FCC catalyst prepared according to the methods described herein in any embodiment.

In another aspect, the present technology provides a method of improving bottoms-coke selectivity in an FCC system, wherein the method includes using an FCC catalyst prepared according to the methods described herein in any embodiment.

Zeolitic Microspherical Material

In an aspect, the preset technology provides a zeolitic microspherical material that includes less than or equal to about 30 wt. % of Y-zeolite and a non-zeolitic matrix material; where the zeolitic microspherical material is free, or substantially free, of zeolite P; the zeolitic microspherical material has a zeolite to matrix ratio of about 0.3 to about 3; and the Y-zeolite is an in situ crystallized Y-zeolite having a unit cell size of about 24.60 Å to about 24.70 Å.

In any embodiment disclosed herein, the zeolitic microspherical material may include Y-zeolite in an amount of at least about 5 wt. % to less than about 30 wt. %, based on total weight of the zeolitic microspherical material. For example, in any embodiment disclosed herein, the zeolitic microspherical material may include Y-zeolite in an amount of about 5 wt. %, about 6 wt. %, about 7 wt. %, about 8 wt. %, about 9 wt. %, about 10 wt. %, about 11 wt. %, about 12 wt. %, about 13 wt. %, about 14 wt. %, about 15 wt. %, about 16 wt. %, about 17 wt. %, about 18 wt. %, about 19 wt. %, about 20 wt. %, about 21 wt. %, about 22 wt. %, about 23 wt. %, about 24 wt. %, about 25 wt. %, about 26 wt. %, about 27 wt. %, about 28 wt. %, about 29 wt. %, less than about 30 wt. %, based on total weight of the zeolitic microspherical material, or any range including and/or in between any two of the preceding values.

In any embodiment disclosed herein, the precursor microspheres may include a non-zeolitic material. Suitable non-zeolitic materials may include, but are not limited to, clay, alumina, or a mixture thereof. In any embodiment disclosed herein, the non-zeolitic material may include calcined halloysite, montmorillonite, bentonite, attapulgite, kaolin, sepiolite, gibbsite, boehmite, aluminosilicate, and silica-alumina. In any embodiment disclosed herein, the non-zeolitic material may be alumina. For example, in any embodiment disclosed herein, the alumina may be formed from crystalline boehmite, bayerite, gamma alumina, transitional alumina, or a mixture thereof.

In any embodiment disclosed herein, the alumina may further include a rare earth element. For example, in any embodiment disclosed herein, the rare earth element may be ytterbium, gadolinium, cerium, lanthanum, yttrium, or a mixture of any two or more thereof. In any embodiment herein, the rare earth element may be lanthanum. In any embodiment disclosed herein, the alumina may include the rare earth element in an amount of about 0.1 wt. % to about 6 wt. %, based on total weight of the zeolitic microspherical material. Suitable amounts of the rare earth element may include, but are not limited to, about 0.1 wt. %, about 0.2 wt. %, about 0.3 wt. %, about 0.4 wt. %, about 0.5 wt. %, about 0.6 wt. %, about 0.7 wt. %, about 0.8 wt. %, about 0.9 wt. %, about 1.0 wt. %, about 1.5 wt. %, about 2.0 wt. %, about 2.5 wt. %, about 3.0 wi. %, about 3.5 wt. %, about 4.0 wt. %, about 4.5 wt. %, about 5.0 wt. %, about 5.5 wt. %, about 6.0 wt. %, based on total weight of the zeolitic microspherical material, or any range including and/or in between any two of the preceding values. In any embodiment disclosed herein, the alumina may include no rare earth element.

In any embodiment disclosed herein, the non-zeolitic material may include calcined halloysite, montmorillonite, bentonite, attapulgite, kaolin, sepiolite, gibbsite, boehmite, aluminosilicate, and silica-alumina.

In any embodiment disclosed herein, the zeolitic microspherical material may be free, or substantially free, of zeolite P. As used herein, "substantially free of zeolite P" refers to amounts of detectable zeolite P that may be less than or equal to about 2 wt. %, based on total weight of the zeolitic microspherical material. For example, in any embodiment disclosed herein, the zeolitic microspherical material may include detectable zeolite P in amounts less than or equal to about 2 wt. % to about 0.01 wt. %, based on total weight of the zeolitic microspherical material. For example, in any embodiment disclosed herein, the zeolitic microspherical material may include detectable zeolite P in amounts of less than or equal to about 2 wt. %, about 1.5 wt. %, about 1.0 wt. %, about 0.5 wt. %, about 0.01 wt. %, based on total weight of the zeolitic microspherical material, or any range including and/or in between any two of the preceding values. In any embodiment disclosed herein, the method as described herein may not form zeolite P. In any embodiment disclosed herein, the zeolitic microspherical material may be free of zeolite P; for example, as disclosed herein in any embodiment, the zeolitic microspherical material may include no detectable amounts of zeolite P. In any embodiment disclosed herein, the zeolite P may include zeolite P1.

In any embodiment disclosed herein, the Y-zeolite may have a unit cell size of about 24.60 Å to about 24.70 Å. Suitable Y-zeolite unit cell sizes may include, but are not limited to, about 24.60 Å, about 24.61 Å, about 24.62 Å, about 24.63 Å, about 24.64 Å, about 24.65 Å, about 24.66 Å, about 24.67 Å, about 24.68 Å, about 24.69 Å, about 24.70 Å, or any range including and/or in between any two of the preceding values.

In any embodiment disclosed herein, the zeolitic microspherical material may have a zeolite surface area of about 30 m$^2$/g to about 200 m$^2$/g. Suitable zeolite surface area amounts may include, but are not limited to, about 30 m$^2$/g, about 35 m$^2$/g, about 40 m$^2$/g, about 45 m$^2$/g, about 50 m$^2$/g, about 55 m$^2$/g, about 60 m$^2$/g, about 65 m$^2$/g, about 70 m$^2$/g, about 75 m$^2$/g, about 80 m$^2$/g, about 85 m$^2$/g, about 90 m$^2$/g, about 95 m$^2$/g, about 100 m$^2$/g, about 105 m$^2$/g, about 110 m²/g, about 115 m²/g, about 120 m²/g, about 125 m²/g, about 130 m²/g, about 135 m²/g, about 140 m²/g, about 145 m²/g, about 150 m²/g, about 155 m²/g, about 160 m²/g, about 165 m²/g, about 170 m²/g, about 175 m²/g, about 180 m²/g, about 185 m²/g, about 190 m²/g, about 195 m²/g, about 200 m²/g, or any range including and/or in between any two of the preceding values.

In any embodiment disclosed herein, the zeolitic microspherical material may have a matrix surface area of about 70 m²/g to about 175 m²/g. Suitable matrix surface area amounts may include, but are not limited to, about 70 m²/g, about 75 m²/g, about 80 m²/g, about 85 m²/g, about 90 m²/g, about 95 m²/g, about 100 m²/g, about 105 m²/g, about 110 m²/g, about 115 m²/g, about 120 m²/g, about 125 m²/g, about 130 m²/g, about 135 m²/g, about 140 m²/g, about 145 m²/g, about 150 m²/g, about 155 m²/g, about 160 m²/g, about 165 m²/g, about 170 m²/g, about 175 m²/g, or any range including and/or in between any two of the preceding values.

In any embodiment disclosed herein, the zeolitic microspherical material may have a zeolite to matrix ratio (Z/M) of about 0.3 to about 3. Suitable zeolite to matrix ratios may include, but are not limited to, about 0.3, about 0.4, about 0.5, about 0.6, about 0.7, about 0.8, about 0.9, about 1.0, about 1.1, about 1.2, about 1.3, about 1.4, about 1.5, about 1.6, about 1.7, about 1.8, about 1.9, about 2.0, about 2.1, about 2.2, about 2.3, about 2.4, about 2.5, about 2.6, about 2.7, about 2.8, about 2.9, about 3.0, or any range including and/or in between any two of the preceding values.

FCC Catalyst

In another aspect, the preset technology provides a FCC catalyst that includes a calcined zeolitic microspherical material that includes less than or equal to about 30 wt. % of Y zeolite and a non-zeolitic matrix material; where the catalyst is free, or substantially free, of zeolite P, the catalyst has a zeolite to matrix ratio of about 0.3 to about 3; and the Y zeolite is an in situ crystallized Y zeolite having a unit cell size of about 24.60 Å to about 24.70 Å.

In any embodiment disclosed herein, the Y zeolite may be an in situ crystallized Y zeolite. For example, in any embodiment disclosed herein, the in situ crystallized Y zeolite may be obtained by mixing precursor microspheres with sodium silicate, a zeolite initiator, and water to form an alkaline slurry; and heating the alkaline slurry to a temperature of about 100° F. (~38° C.) to about 200° F. (~94° C.) to obtain the zeolitic microspherical material. In any embodiment disclosed herein, the in situ crystallized Y zeolite may be obtained according to the in situ crystallization methods described herein in any embodiment.

In any embodiment disclosed herein, the FCC catalyst may include at least about 5 wt. % to less than about 30 wt. %, based on total weight of the catalyst. For example, in any embodiment disclosed herein, the catalyst may include Y-zeolite in an amount of about 5 wt. %, about 6 wt. %, about 7 wt. %, about 8 wt. %, about 9 wt. %, about 10 wt. %, about 11 wt. %, about 12 wt. %, about 13 wt. %, about 14 wt. %, about 15 wt. %, about 16 wt. %, about 17 wt. %, about 18 wt. %, about 19 wt. %, about 20 wt. %, about 21 wt. %, about 22 wt. %, about 23 wt. %, about 24 wt. %, about 25 wt. %, about 26 wt. %, about 27 wt. %, about 28 wt. %, about 29 wt. %, less than about 30 wt. %, based on total weight of the catalyst, or any range including and/or in between any two of the preceding values.

In any embodiment disclosed herein, the FCC catalyst may have a zeolite surface area of about 30 m²/g to about 200 m²/g. Suitable zeolite surface area amounts may include, but are not limited to, about 30 m²/g, about 35 m²/g, about 40 m²/g, about 45 m²/g, about 50 m²/g, about 55 m²/g, about 60 m²/g, about 65 m²/g, about 70 m²/g, about 75 m²/g, about 80 m²/g, about 85 m²/g, about 90 m²/g, about 95 m²/g, about 100 m²/g, about 105 m²/g, about 110 m²/g, about 115 m²/g, about 120 m²/g, about 125 m²/g, about 130 m²/g, about 135 m²/g, about 140 m²/g, about 145 m²/g, about 150 m²/g, about 155 m²/g, about 160 m²/g, about 165 m²/g, about 170 m²/g, about 175 m²/g, about 180 m²/g, about 185 m²/g, about 190 m²/g, about 195 m²/g, about 200 m²/g, or any range including and/or in between any two of the preceding values.

In any embodiment disclosed herein, the FCC catalyst may include a non-zeolitic material. Suitable non-zeolitic materials may include, but are not limited to, clay, alumina, or a mixture thereof. In any embodiment disclosed herein, the non-zeolitic material may include calcined halloysite, montmorillonite, bentonite, attapulgite, kaolin, sepiolite, gibbsite, boehmite, aluminosilicate, and silica-alumina. In any embodiment disclosed herein, the non-zeolitic material may be alumina. For example, in any embodiment disclosed herein, the alumina may be formed from crystalline boehmite, bayerite, gamma alumina, transitional alumina, or a mixture thereof.

In any embodiment disclosed herein, the catalyst may further include a rare earth element. For example, in any embodiment disclosed herein, the rare earth element may be ytterbium, gadolinium, cerium, lanthanum, yttrium, or a mixture of any two or more thereof. In any embodiment herein, the rare earth element may be lanthanum. In any embodiment disclosed herein, the catalyst may include the rare earth element in an amount of about 0.1 wt. % to about 6 wt. %, based on total weigh of the catalyst. Suitable amounts of the rare earth element may include, but are not limited to, about 0.1 wt. %, about 0.2 wt. %, about 0.3 wt. %, about 0.4 wt. %, about 0.5 wt. %, about 0.6 wt. %, about 0.7 wt. %, about 0.8 wt. %, about 0.9 wt. %, about 1.0 wt. %, about 1.5 wt. %, about 2.0 wt. %, about 2.5 wt. %, about 3.0 wt. %, about 3.5 wt. %, about 4.0 wt. %, about 4.5 wt. %, about 5.0 wt. %, about 5.5 wt. %, about 6.0 wt. %, based on total weight of the catalyst, or any range including and/or in between any two of the preceding values.

In any embodiment disclosed herein, the non-zeolitic material may include calcined halloysite, montmorillonite, bentonite, attapulgite, kaolin, sepiolite, gibbsite, boehmite, aluminosilicate, and silica-alumina.

In any embodiment disclosed herein, the Y-zeolite may have a unit cell size of about 24.60 Å to about 24.70 Å. Suitable Y-zeolite unit cell sizes may include, but are not limited to, about 24.60 Å, about 24.61 Å, about 24.62 Å, about 24.63 Å, about 24.64 Å, about 24.65 Å, about 24.66 Å, about 24.67 Å, about 24.68 Å, about 24.69 Å, about 24.70 Å, or any range including and/or in between any two of the preceding values.

In any embodiment disclosed herein, the catalyst may have a matrix surface area of about 70 m²/g to about 175 m²/g. Suitable matrix surface area amounts may include, but are not limited to, about 70 m²/g, about 75 m²/g, about 80 m²/g, about 85 m²/g, about 90 m²/g, about 95 m²/g, about 100 m²/g, about 105 m²/g, about 110 m²/g, about 115 m²/g, about 120 m²/g, about 125 m²/g, about 130 m²/g, about 135 m²/g, about 140 m²/g, about 145 m²/g, about 150 m²/g, about 155 m²/g, about 160 m²/g, about 165 m²/g, about 170 m²/g, about 175 m²/g, or any range including and/or in between any two of the preceding values.

In any embodiment disclosed herein, the catalyst may have a zeolite to matrix ratio (Z/M) of about 0.3 to about 3. Suitable zeolite to matrix ratios may include, but are not limited to, about 0.3, about 0.4, about 0.5, about 0.6, about 0.7, about 0.8, about 0.9, about 1.0, about 1.1, about 1.2, about 1.3, about 1.4, about 1.5, about 1.6, about 1.7, about 1.8, about 1.9, about 2.0, about 2.1, about 2.2, about 2.3, about 2.4, about 2.5, about 2.6, about 2.7, about 2.8, about 2.9, about 3.0, or any range including and/or in between any two of the preceding values.

In a related aspect, the present technology provides a catalyst composition that includes a low zeolite content FCC catalyst, where the composition includes about 0.01 wt. % to 100 wt. % of the low zeolite content FCC catalyst, based on the total weight of the composition; and where the low zeolite content FCC catalyst includes a calcined zeolitic microspherical material that includes less than or equal to about 30 wt. % of Y zeolite and a non-zeolitic matrix material; where the catalyst is free, or substantially free, of zeolite P, the catalyst has a zeolite to matrix ratio of about 0.3 to about 3; and the Y zeolite is an in situ crystallized Y zeolite having a unit cell size of about 24.60 Å to about 24.70 Å. For example, the FCC catalyst may be an FCC catalyst as described herein in any embodiment.

In any embodiment, the catalyst composition includes from about 1.0 wt. % to about 100 wt. % of the low zeolite content FCC catalyst, based on total weight of the composition. For example, in any embodiment disclosed herein, the composition may include an amount of the low zeolite content FCC catalyst may include about 1.0 wt. %, about 2.0 wt. %, about 3.0 wt. %, about 4.0 wt. %, about 5.0 wt. %, about 6.0 wt. %, about 7.0 wt. %, about 8.0 wt. %, about 9.0 wt. %, about 10 wt. %, about 15 wt. %, about 20 wt. %, about 25 wt. %, about 30 wt. %, about 35 wt. %, about 40 wt. %, about 45 wt. %, about 50 wt. %, about 55 wt. %, about 60 wt. %, about 65 wt. %, about 70 wt. %, about 75 wt. %, about 80 wt. %, about 85 wt. %, about 90 wt. %, about 95 wt. %, 100 wt. %, based on total weight of the composition, or any range including and/or in between any two of these values.

In any embodiment disclosed herein, the catalyst composition may be a blend of the low zeolite content FCC catalyst and one or more additional FCC catalysts. In any embodiment disclosed herein, the catalyst composition includes one or more additional FCC catalysts, where the additional FCC catalyst is different from the low zeolite content FCC catalyst as described herein in any embodiment. For example, in any embodiment disclosed herein, the additional FCC catalyst my include an FCC catalyst having a Y zeolite content greater than about 30 wt. %, based on total weight of the catalyst. Additionally or alternatively, in some embodiments, the additional FCC catalyst may have a Y zeolite content that is greater than about 35 wt. %, based on the total weight of the catalyst. For example, in any embodiment disclosed herein, the additional FCC catalyst may include about 35 wt. % to about 65 wt. % Y zeolite, based on total weight of the catalyst. Suitable amounts of Y zeolite in the additional FCC catalyst may include about 35 wt. %, about 37 wt. %, about 39 wt. % about 41 wt. %, about 43 wt. %, about 45 wt. %, about 47 wt. %, about 51 wt. %, about 53 wt. %, about 55 wt. %, about 57 wt. %, about 61 wt. %, about 63 wt. %, about 65 wt. %, based on total weight of the catalyst, or any range including and/or in between any two of these values.

In any embodiment disclosed herein, the catalyst composition may include about 5 wt. % to about 99 wt. % of the additional FCC catalyst, based on total weight of the composition. For example, in any embodiment disclosed herein, the composition may include about 5 wt. %, about 10 wt. %, about 15 wt. %, about 20 wt. %, about 25 wt. %, about 30 wt. %, about 35 wt. %, about 40 wt. %, about 45 wt. %, about 50 wt. %, about 55 wt. %, about 60 wt. %, about 65 wt. %, about 70 wt. %, about 75 wt. %, about 80 wt. %, about 85 wt. %, about 90 wt. %, about 95 wt. %, about 99 wt. %, based on total weight of the composition, or any range including and/or in between any two of these values.

The present invention, thus generally described, will be understood more readily by reference to the following examples, which are provided by way of illustration and are not intended to be limiting of the present invention.

Examples

Example 1. Catalyst microspheres according to the present technology were prepared according to the method as disclosed in U.S. Pat. No. 4,493,902. 98 parts of hydrous kaolin in the form of about 60% solid slurry together with 2 parts of $SiO_2$ in the form of N-brand sodium silicate was spray dried into microspheres having an average particle size of about 80 μm. The microspheres were calcined at 1500° F. (815.56° C.) for 2 hours to convert hydrous kaolin to metakaolin. The resultant microspheres were designated as MS2. 94 parts of 4 wt. % rare earth element doped alumina in the form of 40% solid slurry together with 6 parts of $SiO_2$ in the form of N-brand sodium silicate was spray dried into microspheres having an average particle size about 80 μm. The microspheres were then calcined at 1500° F. (815.56° C.) for 2 hours. The microspheres were designated as Microsphere A.

162 g of Microsphere A, 18 g of MS2, 218 g of N-brand sodium silicate solution (containing about 9 wt. % of $Na_2O$ and 29 wt. % of $SiO_2$), 38 g of recycled sodium silicate solution (RSDS; containing about 13 wt. % of $Na_2O$ and 20 wt. % of Si (2), 131 g of zeolite-Y seeds (containing 13 wt. % of $Na_2O$ and 21 wt. % of $SiO_2$ and 0.5 wt. % of $Al_2O_3$), and 183 g of $H_2O$ were added with stirring to a 1 liter kettle reactor configured for reflux operation. The zeolite-Y seeds were prepared according to the methods disclosed in U.S. Pat. Nos. 4,493,902 and 4,631,262. The mixture was heated to a temperature of either 210° F. (98.9° C.) or 180° F. (82.2° C.) for crystallization. The crystallization reaction was maintained at each respective crystallization temperature with stirring for 10-14 hours, and then quenched to obtain microspheres with in-situ crystallized zeolite. The resultant sample catalysts were then filtered and washed with hot water a few times to get NaY form FCC catalyst.

As shown in FIG. 1, the XRD scan of the catalyst crystallized at 180° F. (82.2° C.') only showed detection of zeolite Y. The zeolite Y content in the catalyst crystallized at 180° F. (82.2° C.) is about 20% based on surface area measurement. For the catalyst crystallized at 210° F. (98.9° C.), most of the zeolite Y converted to zeolite NaP1, and zeolite Y yield only reached 12.9%. Table 1 shows the surface area results of the samples crystallized at both 180° F. (82.2° C.) and 210° F. (98.9° C.).

TABLE 1

| Surface area results of microsphere A crystallized at 180° F. (82.2° C.) and 210° F. (98.9° C.) | | |
| --- | --- | --- |
| Microsphere A | 180° F. crystallization | 210° F. crystallization |
| Total surface area (m²/g) | 257 | 205 |
| Zeolite surface area (m²/g) | 134 | 85 |
| Matrix surface area (m²/g) | 123 | 120 |
| zeolite Y content (%) | 20 | 12.9 |

Example 2. Hydrous kaolin in the form of about 60% solid slurry was spray dried into microspheres having an average particle size about 80 μm. The microspheres were then calcined at 1800° F. (982.2° C.) for 2 hours to convert hydrous kaolin to spinel. The clay chemistry at different calcination temperatures may be found in U.S. Pat. No. 3,338,672, which is incorporated herein in its entirety. The microspheres were designated as Microsphere B.

200 g of Microsphere B, 69 g of caustic solution (containing 50 wt. % of sodium hydroxide), 145 g of zeolite-Y seeds (containing 13 wt. % of $Na_2O$) and 21 wt. % of $SiO_2$ and 0.5 wt. % of $Al_2O_3$), and 183 g of water were added with stirring to a 1 liter kettle reactor configured for reflux operation. The mixture was heated to a temperature of either 210° F. (98.9° C.) or 180° F. (82.2° C.) for crystallization. The crystallization reaction was maintained at each respective crystallization temperature with stirring for 10-14 hours, and then quenched to obtain microspheres with in-situ crystallized zeolite. The resultant sample catalysts were then filtered and washed with hot water a few times to get NaY form FCC catalyst.

Figure 2:
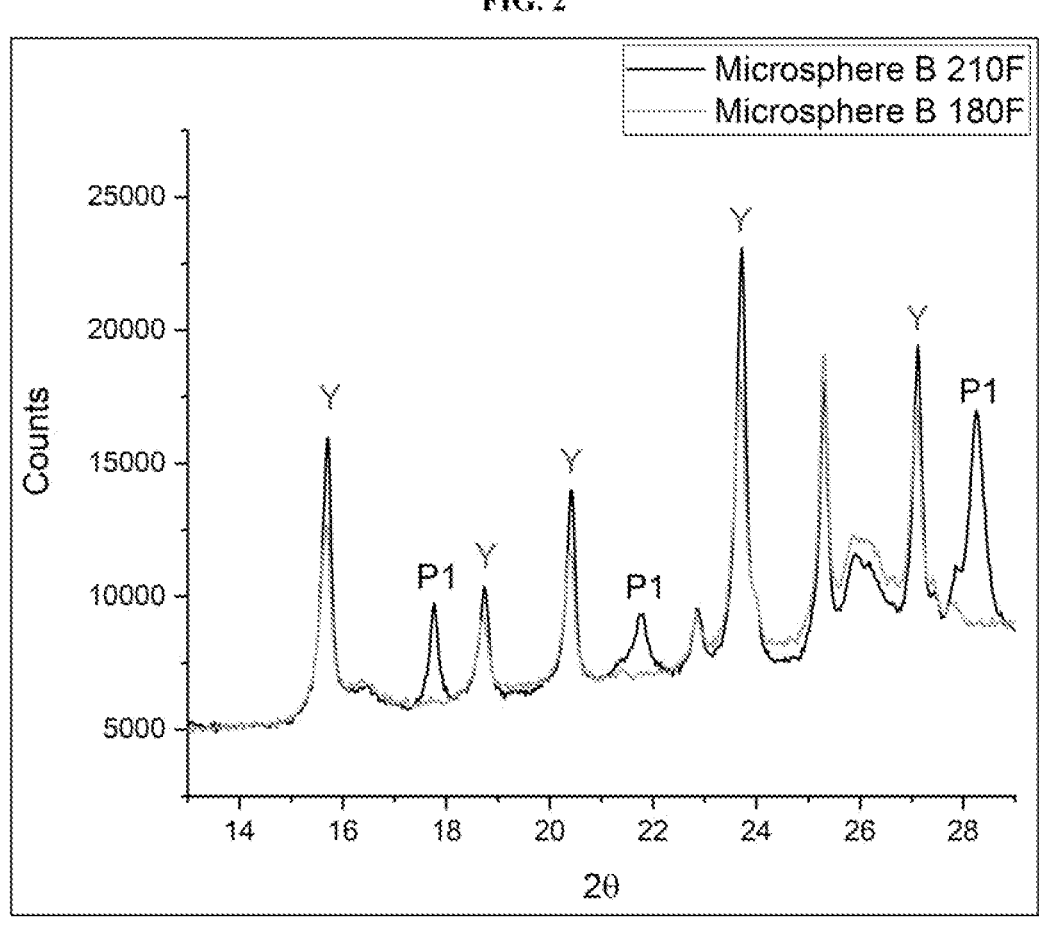
FIG. 2 is a graphical illustration of an XRD scan of catalyst crystallized at both 210° F. and 180° F.

As shown in FIG. 2, the XRD scan of the catalyst crystallized at 180° F. (82.2° C.) only showed detection of zeolite Y. Table 2 showed the zeolite Y content in the catalyst crystallized at 180° F. (82.2° C.). For the catalyst crystallized at 210° F. (98.9° C.), zeolite NaP1 mixed with zeolite Y was detected for the sample crystalized at 210° F. (98.9° C.). As shown in Table 2, surface area measurement indicated that 19% zeolite Y was obtained at 180° F. (82.2° C.) crystallization.

TABLE 2

Surface area results of microsphere B crystallized at 180° F. (82.2° C.)

| Microsphere B | 180° F. crystallization |
|---|---|
| Total surface area ($m^2/g$) | 267 |
| Zeolite surface area ($m^2/g$) | 125 |
| Matrix surface area ($m^2/g$) | 142 |
| zeolite Y content (%) | 19 |

Example 3. 63.7 parts of hydrous kaolin in the form of about 60% solid slurry together with 17.9 parts of crystalline boehmite in the form of about 60% sloid slurry, 17.9 parts spinel (Spinel, clay calcined at 1800° F. (982.2° C.)), 0.5 parts of $SiO_2$ in the form of N-brand sodium silicate were spray dried into microspheres having an average particle size about 80 μm. The microsphere was then calcined at 1800° F. (982.2° C.) for 2 hours to convert hydrous kaolin to spinel. The resultant microspheres were designated as Microsphere C.

167 g of Microsphere C, 13 g of MS2, 416 g of RSDS (containing about 13 wt. % of $Na_2O$ and 20 wt. % of $SiO_2$), 107.4 g of zeolite-Y seeds (containing 13 wt. % of $Na_2O$, 21 wt. % of Si (2, and 0.5 wt. % of $Al_2O_3$), and 265 g of $H_2O$ were added with stirring to a 1 liter kettle reactor configured for reflux operation. The mixture was heated to a temperature of either 210° F. (98.9° C.) or 190° F. (87.8° C.) for crystallization. The crystallization reaction was maintained at each respective crystallization temperature with stirring for 10-14 hours, and then quenched to obtain microspheres with in-situ crystallized zeolite. The resultant sample catalysts were then filtered and washed with hot water a few times to get NaY form FCC catalyst.

Figure 3:
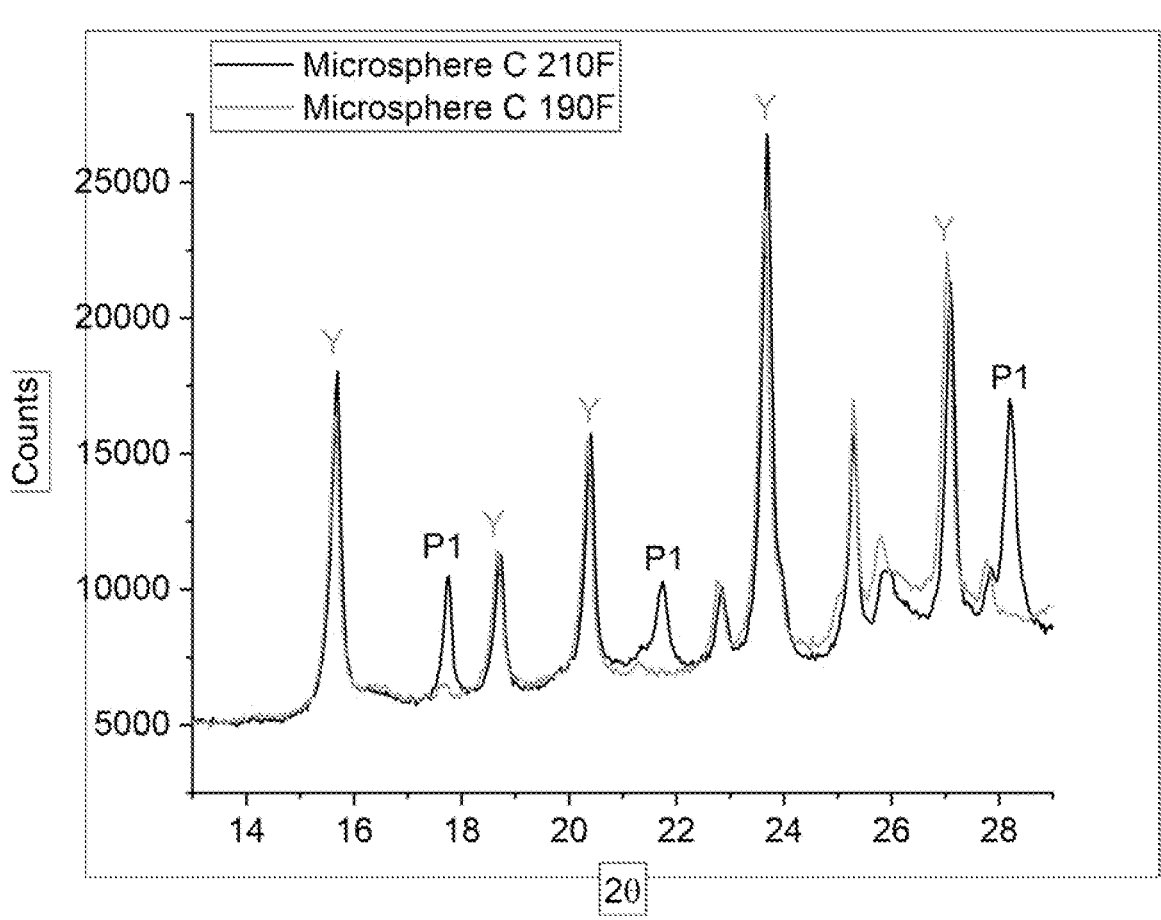
FIG. 3 is a graphical illustration of an XRD scan of catalyst crystallized at both 210° F. and 190° F.

As shown in FIG. 3, the XRD scan of catalyst crystallized at 190° F. (87.8° C.) only showed detection of zeolite Y. For the catalyst crystallized at 210° F. (98.9° C.), zeolite NaP1 mixed with zeolite Y was detected. As shown in Table 3, surface area measurement indicated that 28.5% zeolite Y was obtained at 190° F. (87.8° C.) crystallization but dropped to 27.4% at 210° F. (98.9° C.) crystallization.

TABLE 3

Surface area results of microsphere C crystallized at 190° F (87.8° C.) and 210° F. (98.9° C.).

| Microsphere C | 190° F. crystallization | 210° F. crystallization |
|---|---|---|
| Total surface area ($m^2/g$) | 303 | 301 |
| Zeolite surface area ($m^2/g$) | 188 | 181 |
| Matrix surface area ($m^2/g$) | 115 | 120 |
| zeolite Y content (%) | 28.5 | 27.4 |

Para. A. A method of making a fluid catalytic cracking (FCC) catalyst, the method comprising:

in situ crystallizing Y-zeolite on a precursor microsphere to provide the FCC catalyst, wherein the in situ crystallizing comprises:

mixing the precursor microspheres with sodium silicate, a zeolite initiator, and water to form an alkaline slurry; and heating the alkaline slurry to a temperature of about 100° F. to about 200° F. to obtain a zeolitic microsphere material; and wherein the FCC catalyst has a zeolite content of less than or equal to about 30 weight percent (wt. %).

Para. B. The method of Para. A, wherein the temperature is about 150° F. to about 200° F.

Para. C. The method of Para. A or B, wherein the temperature is about 175° F. to about 185° F.

Para. D. The method of any one of Paras. A-C, wherein the temperature is about 180° F. to about 190° F.

Para. E. The method of any one of Paras. A-D, wherein the heating is for a time sufficient to crystallize at least about 5 wt. % to less than about 30 wt. %.

Para. F. The method of any one of Paras. A-E, wherein at least about 5 wt. % to about 30 wt. % of Y-zeolite is crystallized in or on the precursor microspheres.

Para. G. The method of any one of Paras. A-F, wherein the precursor microspheres comprise a non-zeolitic material.

Para. H. The method of any one of Paras. A-G, wherein the non-zeolitic material comprises clay, alumina, or a mixture thereof.

Para. I. The method of any one of Paras. A-H, wherein the alumina is formed from crystalline boehmite, bayerite, gamma alumina, transitional alumina, or a mixture thereof.

Para. J. The method of any one of Paras. A-I, wherein the alumina further comprises a rare earth element.

Para. K. The method of any one of Paras. A-J, wherein the rare earth element comprises ytterbium, gadolinium, cerium, lanthanum, or a mixture thereof.

Para. L. The method of any one of Paras. A-K, wherein the rare earth element comprises lanthanum.

Para. M. The method of any one of Paras. A-L, wherein the alumina comprises the rare earth element in an amount of about 0.1 wt. % to about 6 wt. %.

Para. N. The method of any one of Paras. A-M, wherein the alumina does not comprise of a rare earth element.

Para. O. The method of any one of Paras. A-N, wherein the non-zeolitic material comprises calcined halloysite, montmorillonite, bentonite, attapulgite, kaolin, sepiolite, gibbsite, boehmite, aluminosilicate, and silica-alumina.

Para. P. The method of any one of Paras. A-O further comprising pre-forming the precursor microspheres, comprising:

spray drying a solid slurry comprising the non-zeolitic material, sodium silicate, or a mixture thereof to obtain the precursor microspheres; and calcining the precursor microspheres at a temperature from about 1500° F. to about 1800° F.

Para. Q. The method of any one of Paras. A-P, wherein the alkaline slurry further comprises sodium hydroxide.

Para. R. The method of any one of Paras. A-Q, wherein the alkaline slurry comprises a weight ratio of zeolite initiator to precursor microspheres is from about 0.0002 to about 0.01.

Para. S. The method of any one of Paras. A-R, wherein the alkaline slurry comprises a weight ratio of reactive $SiO_2$ to $Al_2O_3$ of about 5 to about 80.

Para. T. The method of any one of Paras. A-S, wherein the alkaline slurry comprises a weight ratio of reactive $SiO_2$ to $Na_2O$ of about 1 to about 5.

Para. U. The method of any one of Paras. A-T, wherein the alkaline slurry comprises a weight ratio of water to $Na_2O$ of about 3 to about 12.

Para. V. The method of any one of Paras. A-U, wherein the zeolitic microspherical material comprises less than or equal to about 2 wt. % of zeolite P.

Para. W. The method of any one of Paras. A-V, wherein the zeolitic microspherical material is free, or substantially free, of zeolite P.

Para. X. The method of any one of Paras. A-W, wherein the method does not form zeolite P.

Para. Y. The method of any one of Paras. A-X further comprising separating the zeolitic microspherical material from the alkaline slurry.

Para. Z. The method of any one of Paras. A-Y, wherein the Y zeolite has a unit cell size of about 24.60 Å to about 24.70 Å.

Para. AA. The method of any one of Paras. A-Z, wherein the FCC catalyst has a zeolite surface area from about 30 $m^2/g$ to about 200 $m^2/g$.

Para. AB. The method of any one of Paras. A-AA, wherein the FCC catalyst has a matrix surface area of about 70 $m^2/g$ to about 175 $m^2/g$.

Para. AC. The method of any one of claims A-AB, wherein the FCC catalyst has a zeolite to matrix ratio of about 0.3 to about 3.

Para. AD. A FCC catalyst prepared according to the method of any one of Paras. A-AC.

Para. AE. A method of cracking a hydrocarbon feed comprising contacting said feed with a FCC catalyst prepared according to Paras. A-AC.

Para. AF. A zeolitic microspherical material comprising less than or equal to about 30 wt. % of Y zeolite and a non-zeolitic matrix material;

wherein:

the material is free, or substantially free, of zeolite P;

the material has a zeolite to matrix ratio of about 0.3 to about 3; and the Y zeolite is an in situ crystallized Y zeolite having a unit cell size of about 24.60 Å to about 24.70 Å.

Para. AG. The material of Para. AF, wherein the zeolitic microspherical material comprises Y-zeolite in an amount of at least about 5 wt. % to less than about 30 wt. %.

Para. AH. The material of any one of Paras. AF or AG, wherein the zeolitic microspherical material has a zeolite surface area from about 30 $m^2/g$ to about 200 $m^2/g$.

Para. AI. The material of any one of Paras. AF-AH, wherein the zeolitic microspherical material has a matrix surface area of about 70 $m^2/g$ to about 175 $m^2/g$.

Para. AJ. The material of any one of Paras. AF-AI, wherein the non-zeolitic matrix material comprises clay, alumina, or a mixture thereof.

Para. AK. The material of any one of Paras. AF-AJ, wherein the alumina is formed from crystalline boehmite, bayerite, gamma alumina, transitional alumina, or a mixture thereof.

Para. AL. The material of any one of Paras. AF-AK, wherein the alumina further comprises a rare earth element.

Para. AM. The material of any one of Paras. AF-AL, wherein the rare earth element comprises ytterbium, gadolinium, cerium, lanthanum, or a mixture thereof.

Para. AN. The material of any one of Paras. AF-AM, wherein the rare earth element comprises lanthanum.

Para. AO. The material of any one of Paras. AF-AN, wherein the alumina does not comprise of a rare earth element.

Para. AP. The material of any one of Paras. AF-AO, wherein the material comprises about 0.1 wt. % to about 6 wt. % of a rare earth element.

Para. AQ. The material of any one of Paras. AF-AP, wherein the non-zeolitic matrix material comprises calcined halloysite, montmorillonite, bentonite, attapulgite, kaolin, sepiolite, gibbsite, boehmite, aluminosilicate, and silica-alumina.

Para. AR. A FCC catalyst comprising a calcined zeolitic microspherical material comprising less than or equal to about 30 wt. % of Y zeolite and a non-zeolitic matrix material;

wherein:

the catalyst is free, or substantially free, of zeolite P;

the catalyst has a zeolite to matrix ratio of about 0.3 to about 3; and the Y zeolite is an in situ crystallized Y zeolite having a unit cell size of about 24.60 Å to about 24.70 Å.

Para. AS. The FCC catalyst of Para. AR, wherein the in situ crystallized Y zeolite is obtained by:

mixing precursor microspheres with sodium silicate, a zeolite initiator, and water to form an alkaline slurry; and heating the alkaline slurry to a temperature of about 100° F. to about 200° F. to obtain the zeolitic microsphere material.

Para. AT. The catalyst of Paras. AR or AS, wherein the zeolitic microspherical material comprises Y-zeolite in an amount of at least about 5 wt. % to less than about 30 wt. %.

Para. AU. The catalyst of any one of Paras. AR-AT, wherein catalyst has a zeolite surface area from about 30 $m^2/g$ to about 200 $m^2/g$.

Para. AV. The catalyst of any one of Paras. AR-AU, wherein the non-zeolitic matrix material comprises clay, alumina, or a mixture thereof.

Para. AW. The catalyst of any one of Paras. AR-AV, wherein the alumina is formed from crystalline boehmite, bayerite, gamma alumina, transitional alumina, or a mixture thereof.

Para. AX. The catalyst of any one of Paras. AR-AW further comprising a rare earth element.

Para. AY. The catalyst of any one of Paras. AR-AX, wherein the rare earth element comprises ytterbium, gadolinium, cerium, lanthanum, or a mixture thereof.

Para. AZ. The catalyst of any one of Paras. AR-AY, wherein the catalyst comprises about 0.1 wt. % to about 6 wt. % of a rare earth element.

Para. BA. The catalyst of any one of Paras. AR-AZ, wherein the non-zeolitic matrix material comprises calcined halloysite, montmorillonite, bentonite, attapulgite, kaolin, sepiolite, gibbsite, boehmite, aluminosilicate, and silica-alumina.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including." "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, or compositions, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A method of making a fluid catalytic cracking (FCC) catalyst, the method comprising:
   in situ crystallizing Y-zeolite on a precursor microsphere to provide the FCC catalyst,
   wherein the in situ crystallizing comprises:
      mixing the precursor microspheres with sodium silicate, a zeolite initiator, and water to form an alkaline slurry; and
      heating the alkaline slurry to a temperature of about 100° F. to 200° F. to obtain a zeolitic microsphere material; wherein heating is conducted for a time sufficient to crystallize less than or equal to about 30 weight percent (wt. %) of Y-zeolite in the zeolitic microspherical material, based on total weight of the zeolitic microspherical material.

2. The method of claim 1, wherein the temperature is about 150° F. to 200° F.

3. The method of claim 1, wherein at least about 5 wt. % to about 30 wt. % of Y-zeolite is crystallized in or on the precursor microspheres.

4. The method of claim 1, wherein the precursor microspheres comprise a non-zeolitic material.

5. The method of claim 4, wherein the non-zeolitic material comprises clay, alumina, or a mixture thereof.

6. The method of claim 5, wherein the alumina further comprises a rare earth element.

7. The method of claim 6, wherein the alumina comprises the rare earth element in an amount of about 0.1 wt. % to about 6 wt. %.

8. The method of claim 1, wherein the alkaline slurry further comprises sodium hydroxide.

9. The method of claim 1, wherein the alkaline slurry comprises a weight ratio of zeolite initiator to precursor microspheres from about 0.0002 to about 0.01.

10. The method of claim 1, wherein the zeolitic microspherical material is free, or substantially free, of zeolite P.

11. The method of claim 1, wherein the Y zeolite has a unit cell size of about 24.60 Å to about 24.70 Å.

12. The method of claim 1, wherein the FCC catalyst has a zeolite surface area from about 30 m²/g to about 200 m²/g.

13. The method of claim 1, wherein the FCC catalyst has a matrix surface area of about 70 m²/g to about 175 m²/g.

14. The method of claim 12, wherein the FCC catalyst has a ratio of zeolite surface area to matrix surface area of about 0.3 to about 3.

15. A FCC catalyst prepared according to the method of claim 1.

16. A method of cracking a hydrocarbon feed comprising contacting said feed with the FCC catalyst of claim 15.

17. The method of claim 1, wherein the heating of the alkaline slurry comprises heating to a temperature of 150° F. to 200° F. to obtain the zeolitic microsphere material, wherein heating is conducted for a time sufficient to crystallize from at least about 5 wt. % to less than about 30 wt. % of Y-zeolite in the zeolitic microsphere material, based on total weight of the zeolitic microsphere material.

18. A method of making a fluid catalytic cracking (FCC) catalyst, the method comprising:

in situ crystallizing Y-zeolite on a precursor microsphere to provide the FCC catalyst, wherein the in situ crystallizing comprises:

mixing the precursor microspheres with sodium silicate, a zeolite initiator, and water to form an alkaline slurry; and heating the alkaline slurry to a temperature of 150° F. to 200° F. to obtain a zeolitic microspherical material, wherein heating is conducted for a time sufficient to crystallize from at least about 5 wt. % to less than about 30 wt. % of Y-zeolite in the zeolitic microspherical material, based on total weight of the zeolitic microspherical material;

wherein the material is free, or substantially free, of zeolite P.

* * * * *